United States Patent
Crawford et al.

(10) Patent No.: US 6,502,113 B1
(45) Date of Patent: Dec. 31, 2002

(54) NEGOTIATION MANAGER INCORPORATING CLAUSE MODIFICATION AND MARKERS FOR TRACKING NEGOTIATION PROGRESS

(76) Inventors: John E. Crawford, 26021 S. 99 Dr., Sun Lakes, AZ (US) 85248; Ronald M. Kudla, 4727 SW. 103rd. Ter., Gainesville, FL (US) 32608

(*) Notice: Subject to any disclaimer, the term of this patent is extended or adjusted under 35 U.S.C. 154(b) by 0 days.

(21) Appl. No.: 09/197,655

(22) Filed: Nov. 23, 1998

(51) Int. Cl.[7] .......................... G06F 15/00; G06F 17/00; G06F 7/00
(52) U.S. Cl. .......................... 707/530; 707/531; 705/80
(58) Field of Search .......................... 707/530, 5, 531, 707/511, 104.1; 705/1, 35, 80, 37; 345/329; 380/268

(56) References Cited

U.S. PATENT DOCUMENTS

| | | | |
|---|---|---|---|
| 4,962,475 A | | 10/1990 | Hernandez et al. ......... 707/515 |
| 5,181,162 A | | 1/1993 | Smith et al. ................. 707/530 |
| 5,226,117 A | | 7/1993 | Miklos ........................ 345/356 |
| 5,495,412 A | * | 2/1996 | Thiessen ........................ 705/1 |
| 5,615,269 A | * | 3/1997 | Micali ......................... 705/80 |
| 5,692,206 A | * | 11/1997 | Shirley et al. .............. 707/531 |
| 5,890,177 A | * | 3/1999 | Moody et al. .............. 707/511 |
| 5,956,687 A | * | 9/1999 | Wamsley et al. .............. 705/1 |
| 6,026,410 A | * | 2/2000 | Allen et al. .............. 707/104.1 |
| 6,055,531 A | * | 4/2000 | Bennett et al. ................ 707/5 |
| 6,067,531 A | * | 5/2000 | Hoyt et al. .................... 705/35 |
| 6,088,702 A | * | 7/2000 | Plantz et al. ................ 345/329 |
| 6,219,423 B1 | * | 4/2001 | Davis .......................... 380/268 |
| 6,137,727 A1 | * | 11/2001 | May ............................. 705/37 |

OTHER PUBLICATIONS

Cutkosky, Mark R. et al., Madefast: collaborative engineering over the Internet, Communications of the ACM, vol. 39, Issue 9. pp.78–87, Sep. 1996.*
Beachfire Collaborative Negotiation Solutions, Web page (Apr. 6, 2001), downloaded from url: <http://www.beachfire.com/aboutus_newsandevents_press_04062001a.html>, on Jan. 29, 2002, pp. 1–2.*
Hart–Davis, Guy, The ABCs of Word 97 Second Edition, 1997 SYBEX Inc., pp. 335–340.*

* cited by examiner

Primary Examiner—Joseph H. Feild
Assistant Examiner—William L. Bashore
(74) Attorney, Agent, or Firm—Akerman Senterfitt

(57) ABSTRACT

A method for managing negotiations between parties, comprising the steps of: storing a selected document having a plurality of negotiable clauses; creating a first retrievable display relating to the document; updating the document as the clauses are modified by the parties, so that each clause corresponds to the last of the modifications; creating a plurality of respective, retrievable clause displays for all modifications of the clauses as each clause is negotiated; creating a retrievable summary display for the clauses; and, visually coding the retrievable displays to distinguish between clauses which have not been negotiated and clauses which have been agreed to, and so that updated clauses which have not yet been agreed to are attributed to one of the parties, whereby the negotiations can be tracked by reviewing the visually coded displays. All of the steps can be implemented at an Internet web site.

20 Claims, 15 Drawing Sheets

310

SESSION REGISTRATION

SESSION [4]

Party of the First                    Party of the Second Part

| o Organization | o Organization |
| Customer Service Training | World Wide Product | o Ab  NOTE: The system detected the existence of several negotiation
CS   brackets. This must be an ongoing negotiation session. To assure the
     accuracy of your records, check the information on this registration page
     because it will appear in documents you print during this session. The
o Ne SESSION No. was increased by "one" when you clicked the "begin"
Joh  button. The date has been updated.
         If there are different persons involved in the negotiation, enter their
     names on this page before you move on.
o Ses
Jul      CLICK ANYWHERE ON THIS FIELD TO CLOSE IT o Special Comments | o Special Comments
Patenting demonstration | Demonstration project Continue

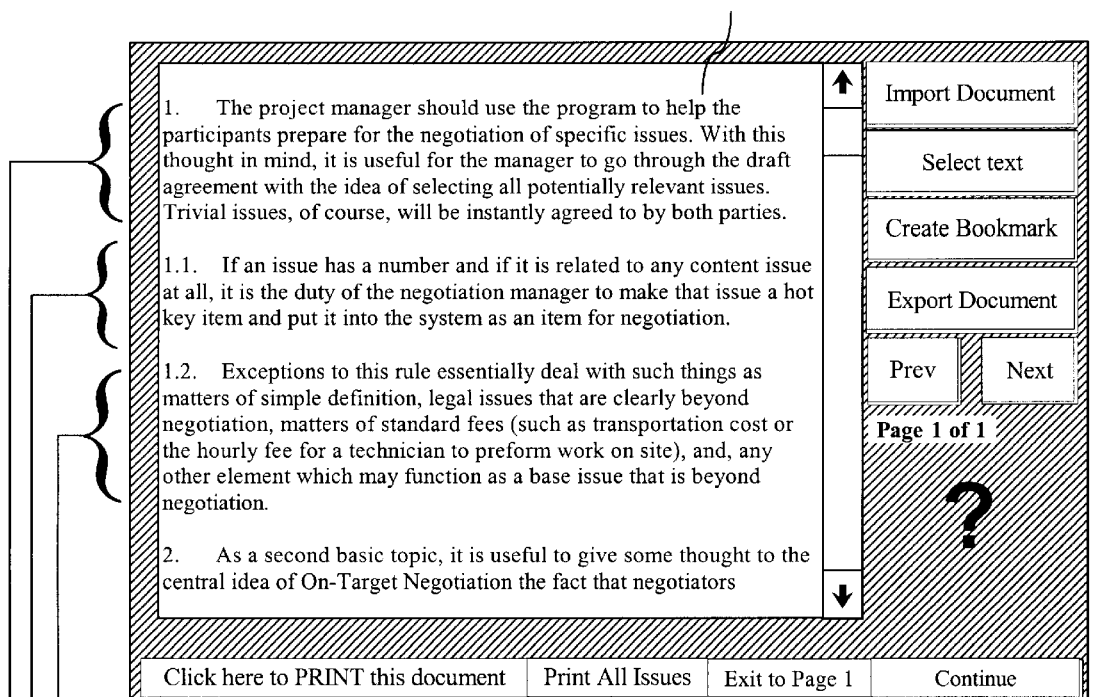
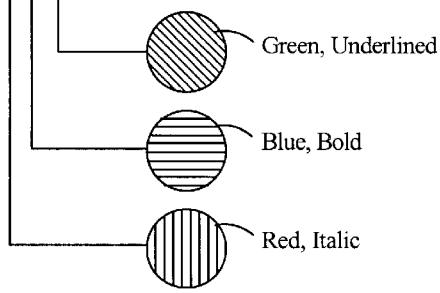
FIG. 11

NEGOTIATION MANAGER INCORPORATING CLAUSE MODIFICATION AND MARKERS FOR TRACKING NEGOTIATION PROGRESS

BACKGROUND OF THE INVENTION

1. Field of the Invention

This invention relates to the field of negotiations, and in particular, to a document management system for tracking and recording on-going negotiations at a micro-level and a macrolevel.

2. Description of Related Art

Negotiations are very unstructured affairs in almost every respect. Negotiations are adversarial by nature, even when the parties have a genuine desire to reach an agreement. The adversarial character is reflected by almost every aspect of the process. Firstly, each party desires to control the paperwork. Computers have alleviated this issue to some extent. Many word processing programs have a revision tool by means of which revisions can be made on a tentative or provisional basis, and be coded by color or underlining, in a manner that some or all of the revisions can be accepted at a later time and automatically implemented. If the parties have the same software the document can be transferred back and forth, but there is no easy way to track the changes or determine the status of uncoded clauses.

There is a long-felt need for obviating the counter-productive desire to control the paperwork. In the event the paperwork is shared by transmission between parties, there remains a long-felt need to obviate having to have the same, if not completely compatible word processing systems.

Negotiators keep independent notes which may never be seen by others, including the negotiator's manager, except when a dispute arises as to the meaning or consequence of a previous change or position, or as to the reason certain clause language was accepted by one party, perhaps subject to another point being yielded by the other party. In this instance, the notes usually reflect the differing position of each party, so that the previously decided issue must be renegotiated. When negotiations take place over a period of time, or in a series of negotiating sessions, the parties often forget where the discussions were interrupted, forgetting either genuinely or by design. Parties are also prone to forget undocumented agreements to be implemented later, or in some cases, the parties clearly remember these issues differently.

Managers have a particularly difficult task in monitoring and evaluating the negotiating efficiency of the negotiators as there is little recorded information regarding how and why certain clauses were agreed to in a manner more favorable to one party than the other. Once again, those personal notes can represent, or can be made to represent, a very selective record.

There is a long-felt need for a system for managing and tracking negotiations, which facilitates generation of a complete, on-going and accurate historical written record of the entire negotiation, and which enables each party to determine the status of every clause in an agreement at any time. Such a negotiation management system can benefit both the negotiators and the managers during the course of discussions, and can ultimately benefit the principals by improving the quality of the negotiations themselves.

It is frequently desired to incorporate predrafted clauses from form books and the like to speed implementation of proposed revisions and revisions which have been agreed to in terms, assuming appropriate language is adopted. Such clauses are available on CD ROMs, for example, but there is no integrated system available by which all parties can easily import such clauses into a document being negotiated.

There is a long-felt need for an integrated system by which predrafted clauses can be easily imported into a document being negotiated by any party and at any time.

Finally, it is often helpful to conduct negotiations on neutral ground. Negotiations conducted in-person can be conducted in a rented facility, but this is often an unacceptable expense and inconvenience, and in any event, often takes place in a host city or location associated with one of the parties. In the event negotiations take place at a distance, for example by transmission of a document in some form back and forth between the parties, only one party has access to the document at a time. This can be inconvenient, if not a source of considerable frustration.

There is a long-felt need to establish a neutral ground which provides each long-distance negotiator with equal and essentially unrestricted access to the document being negotiated and an associated record of the negotiations.

SUMMARY OF THE INVENTION

Each of the long-felt needs of the prior art is satisfied by the negotiation management system taught herein, which can be embodied as a method for managing negotiations, a method for facilitating negotiations and a computer apparatus programmed for enabling the methods to be practiced.

The negotiation manager, or management system, taught herein is a universal document management system which allows two or more parties to divide a proposed contract, or a draft letter of agreement, into specific issues that can then be edited during a series of iterations until both parties feel an optimum "win/win" agreement has been reached. A core feature of the system is a so-called "bracketing" facility which allows a clause to be physically and visually isolated from within a base or starting document. The bracketed clause is then copied to respective positions associated with each party, but visible to both parties, at which each party can take turns making respective revisions. As each party makes changes in the wording of the bracketed, or targeted clause, the system records all changes until mutually acceptable language is finally proposed and the bracketed issue can be identified as having been agreed to.

The system also enables the negotiators to make an instant assessment of any and all issues so as to balance tradeoffs and track the conflict. For example, the system can allow the parties to track struggles to define a suitable up-front payment in relation to a final agreement on annual minimums. As the up-front payment request increases, the parties would be expected to lower the annual minimums.

Each recorded change to a bracketed clause becomes a revision to the base document, which is continually updated. In effect, the parties are creating a series of draft agreements during the negotiation process. The system also allows the parties to create new issues and treat them as bracketed items in their own right. When each new issue is created, the draft agreement is updated to include the new issue and the system brackets the issue in the system itself. The new language, in effect, becomes another draft clause that can be reciprocally edited until it is suitable for the final agreement.

Two management features help the negotiators keep track of the negotiation process even when negotiations take place over a matter of weeks, or longer, and involve dozens of disputed issues. The first feature is visual coding, one example of which is color coding. Each clause in the base document can be color coded to distinguish between clauses which have been agreed to and clauses which have not been negotiated. The bracketed clauses can be color coded to identify the party originating that version of a modified clause as the modified clause automatically appears in the updated document. The document can then be color coded to further distinguish clauses which are being negotiated and to identify which party has made the most recent proposal. This has the subtle but very significant effect of unambiguously tracking the turn taking obligations of the parties. This technique virtually abolishes the kind of crunch strategies which are bound up with aggressive win/lose negotiations. In other words, this program helps negotiators avoid the so-called "Japanese" type of turn taking evasion, in which bottom line judgments are avoided by saying "Your proposal might be difficult." Such a strategy can sometimes pressure an opposing negotiator into making a change in his or her most recent proposal, thus leading the negotiator into the trap of negotiating with him or herself. The system virtually forces both parties to make concrete changes to the agreement until a mutually agreeable endpoint is attained.

A second major management feature is a color coded bracket summary page. This page provides a convenient overview of all the issues at dispute in the negotiation. Issues that have been agreed to show up as brackets of a first color, consistent with the color coding of the document. The color RED, for example, can identify issues containing language offered up by the party of the first part, often the initiator of the agreement effort and the author of the initial draft document. Brackets that are the color BLUE, for example, can indicate that the language suggested by the party of the second part is currently featured in the full text of the agreement as it is now worded. Simply by noting the color of the bracket, a negotiator is focused on issues that require special attention and creative new responses. Clauses which have been agree to can, for example, be coded by the color GREEN, both in the document and by the summary bracket. Many other kinds of visual coding can be utilized.

These two management features allow negotiators to maintain an overarching perspective toward the negotiation. As such, if a single issue becomes a major sticking point, the program helps the negotiators bypass dozens of pages of complex jargon and dozens of resolved conflicts so they can bring all their attention to bear on the troubled issue.

The system provides a unique historical record of the negotiation at both a microscopic and macroscopic level. At the microscopic level of a single bracketed issue, each change made by a participant is recorded in a linear list so that the sequence of moves that was made to attain a final solution can be reviewed by the participants or by a high level manager. In this sense, the system is the first tool designed to hold negotiators accountable for the quality of the conflict they generate during the process of negotiation. A manager can rapidly discover instances where his or her negotiator allowed important changes to be introduced into the agreement as a cost free capitulation. In fact, the historical record of every bracketed issue can be printed at any time. As a further tool to help explain matters of strategy or issues of settlement philosophy, the system allows annotations or other notes to be generated and recorded as part of the issue summary.

At the macroscopic level, the program allows the parties to print complete versions of the agreement at the conclusion of every round of negotiations. Without having to incur the tremendous legal cost and distressing delay associated with having lawyers draft interim agreements, persons using the system stay in full control of the entire process. When the final agreement is tentatively completed, the most current version of the agreement can be given to lawyers for minor revisions. The final agreement can thus be prepared for formal signatures in extremely rapid order.

The system can be compatible with virtually every word processing system and a base or starting document can be imported from almost any source. For example, the system can operate with rich text format, a format to and from which almost every word processing program can convert text. The record of the negotiations can be enhanced by first establishing a bibliographic record of the participants and by associating date and time stamps with each revision, indeed with each proposed revision of the agreement. Each negotiation has a permanent running clock.

One or more sources of predrafted clauses can be easily integrated with the system to enable both parties to easily peruse and import appropriate language for implementing agreed upon terms.

The system can be implemented by a software application running on a computer, for example a personal computer of each party. The system can also be implemented at an Internet web site, which would serve as a neutral venue and which could be accessed by the parties, alone and together, at any time of the night or day. This is particularly useful for negotiators whose local time zones are literally day and night to one another. Such an Internet web site can become a virtual negotiating center for a plurality of ongoing negotiations regarding different matters and between different parties. The document and associated record remain at the web site and thus eliminate the need to transmit documents back and forth. The issue of controlling the paperwork is also obviated A method for managing negotiations between parties, in accordance with an inventive arrangement, comprises the steps of: storing a selected document having a plurality of negotiable clauses; creating a first retrievable display relating to the document; updating the document as the clauses are modified, so that each clause corresponds to the last of the modifications; and, visually coding the first retrievable display to identify clauses which have not been negotiated, whereby the negotiations can be tracked by reviewing the visually coded display.

The method can further comprise the step of visually coding the first retrievable display to distinguish between clauses which have not been negotiated and clauses which have been agreed to. The method still further comprise the step of visually coding or further visually coding, as appropriate, the first retrievable display so that those of the updated clauses which have not yet been agreed to are attributable to one of the parties.

The method can further comprise the steps of: creating a plurality of respective retrievable clause displays for all the modifications of the clauses as each clause is negotiated; and, visually coding the plurality of respective retrievable clause displays so that the modifications are attributable to respective ones of the parties.

The method can further comprise, alone or together with the preceding step, the steps of: creating a retrievable summary display for all the clauses, each clause being represented by a summary identifier; and, visually coding each summary identifier consistent with the step of visually coding the plurality of respective retrievable clause displays.

The visual coding, or further visual coding as appropriate, can be implemented by the step of visually coding by at least one of: foreground color; background color; font face; font style; borders; and, brackets.

The method can further comprise the step of first recording bibliographic information identifying the parties and the parties' negotiators. The selecting step can comprise the step of importing the selected document from another application. Date and time information can be associated with each of the modifications. The modifications can be implemented by linking to at least one source of selectable clauses and copying selected ones of the selectable clauses. Retrievable notes relating to respective ones of the negotiated clauses can also be recorded.

The method can further comprise the steps of: storing all information recorded in connection with the negotiations in at least one data file, whereby the at least one data file can be sent back and forth between the parties. Alternatively, the method can further comprise the steps of: storing all information recorded in connection with the negotiations on an Internet web site; and, enabling access to the information by the parties over the Internet.

A method for facilitating negotiations, in accordance with a further inventive arrangement, comprises the steps of: enabling at an Internet web site a selection of a document having a plurality of negotiable clauses; creating at the Internet web site a first retrievable display related to the document; providing authorized parties access to the retrievable display over the Internet; updating the document as the clauses are modified during the negotiations, so that each clause corresponds to the last of the modifications; and, visually coding the first retrievable display to identify clauses which have not been negotiated, whereby the negotiations can be tracked.

The method can further comprise the step of visually coding the first retrievable display to distinguish between clauses which have not been negotiated and clauses which have been agreed to. The method also further comprise the step of further visually coding the first retrievable display so that those of the updated clauses which have not yet been agreed to are attributable to one of the parties.

The method can further comprise the steps of: creating a retrievable summary display for all the clauses, each clause being represented by a summary identifier; and, visually coding each summary identifier. The summary identifier can be visually coded consistent with the steps of visually coding and further visually coding the first retrievable display.

The method can further comprise, with and without the step of creating the retrievable summary display, the steps of: creating a plurality of respective retrievable clause displays for all the modifications of the clauses as each clause is negotiated; and, visually coding the plurality of respective retrievable clause displays so that the modifications are attributable to respective ones of the parties.

The visual coding, or further visual coding as appropriate, can be implemented by the step of visually coding by at least one of: foreground color; background color; font face; font style; borders; and, brackets.

The method can further comprise the step of first recording bibliographic information identifying the parties and the parties' negotiators. The selecting step can comprise the step of importing the document from another application. Date and time information can be associated with each of the modifications. Sources of selectable clauses can be made available at the web site for copying by the parties to implement the modifications. Retrievable notes relating to respective ones of the negotiated clauses can also be recorded.

A computer apparatus programmed with a routine set of instructions stored in a fixed medium, in accordance with another inventive arrangement, comprises: means for selecting a document having a plurality of negotiable clauses; means for creating a first retrievable display relating to the document; means for updating the document as the clauses are modified, so that each clause corresponds to the last of the modifications; and, means for visually coding the first retrievable display to identify clauses which have not been negotiated, whereby the negotiations can be tracked by reviewing the visually coded display.

The computer apparatus can further comprise means for visually coding the first retrievable display to distinguish between clauses which have not been negotiated and clauses which have been agreed to. The computer apparatus can also further comprise means for further visually coding the first retrievable display so that those of the updated clauses which have not yet been agreed to are attributable to one of the parties.

The computer apparatus can further comprise: means for creating a plurality of respective retrievable clause displays for all the modifications of the clauses as each clause is negotiated; and, means for visually coding the plurality of respective retrievable clause displays so that the modifications are attributable to respective ones of the parties.

The computer apparatus can further comprise, with and without the means for creating a plurality of respective retrievable clause displays: means for creating a retrievable summary display for all the clauses, each clause being represented by a summary identifier; and, means for visually coding each summary identifier consistent with the visually coding of the plurality of respective retrievable clause displays. Each summary identifier is visually coded consistent with the visual coding the first retrievable display and the visual coding of the plurality of respective retrievable clause displays.

The visual coding and the further visual coding can be implemented by at least one of: foreground color; background color; font face; font style; borders; and, brackets.

The computer apparatus can further comprise: means for accessing sources of selectable clauses; and, means for copying one of the selectable clauses to implement the modifications.

The computer apparatus can further comprise: each of the means being operable at an Internet web site; and, means for providing authorized parties access to the Internet web site for negotiating and tracking the negotiations.

A method for managing negotiations between parties, in accordance with yet another inventive arrangement, comprises the steps of: storing a selected document having a plurality of negotiable clauses; creating a first retrievable display relating to the document; updating the document as the clauses are modified by the parties, so that each clause corresponds to the last of the modifications; creating a plurality of respective, retrievable clause displays for all modifications of the clauses as each clause is negotiated; creating a retrievable summary display for the clauses; and, visually coding the retrievable displays to distinguish between clauses which have not been negotiated and clauses which have been agreed to, and so that updated clauses which have not yet been agreed to are attributed to one of the parties, whereby the negotiations can be tracked by reviewing the visually coded displays. All of the steps can be implemented at an Internet web site.

BRIEF DESCRIPTION OF THE DRAWINGS

FIG. 9 is an example of a registration and status note overlay screen display generated in accordance with the inventive arrangements.

FIG. 11 is an example of visual coding as applied to the file management screen display shown in FIG. 10.

DETAILED DESCRIPTION OF THE PREFERRED EMBODIMENTS

Figure 1:
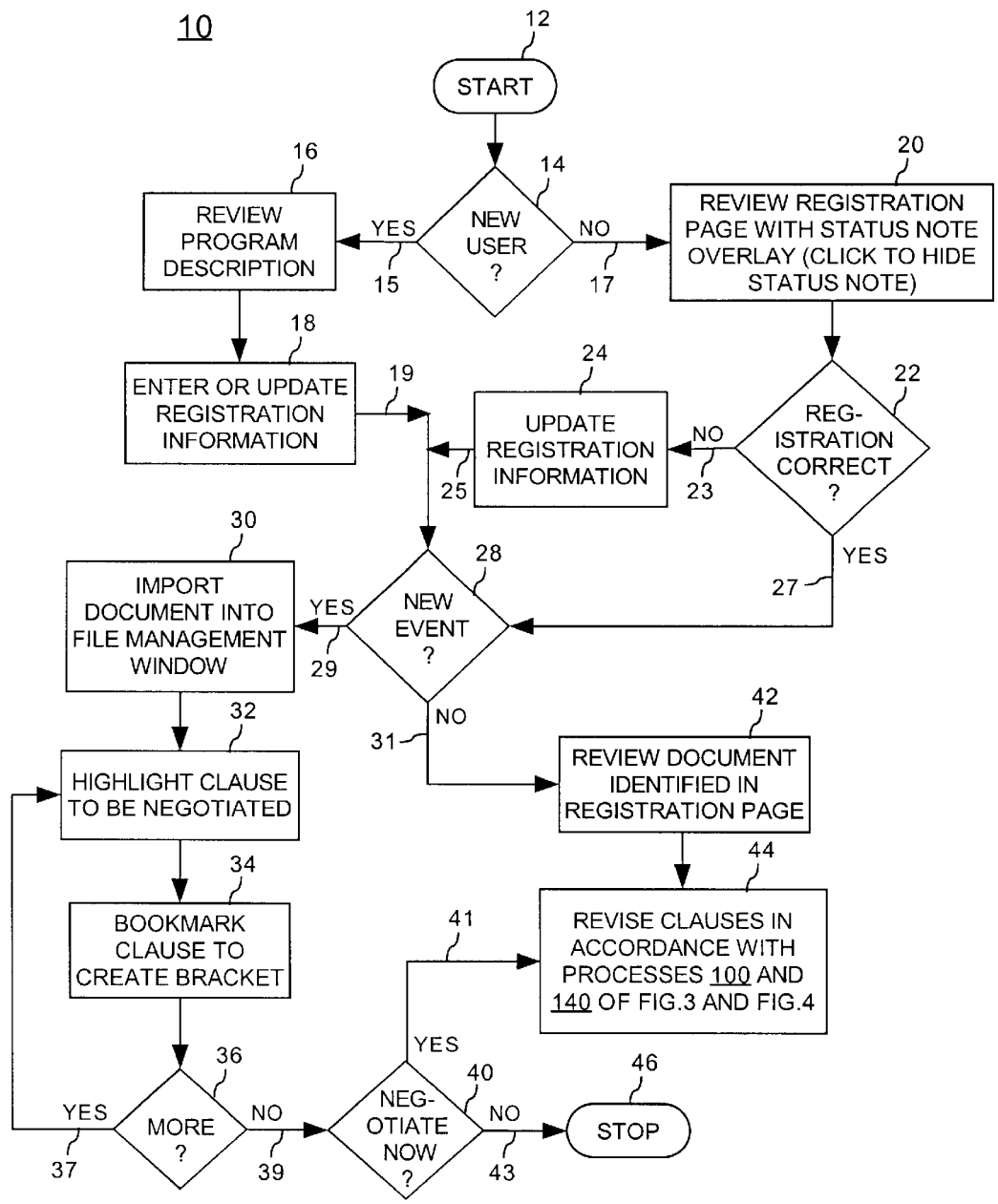
FIG. 1 is a flow chart illustrating a method for initiating negotiations in accordance with the inventive arrangements, from a user perspective.
Figure 2:
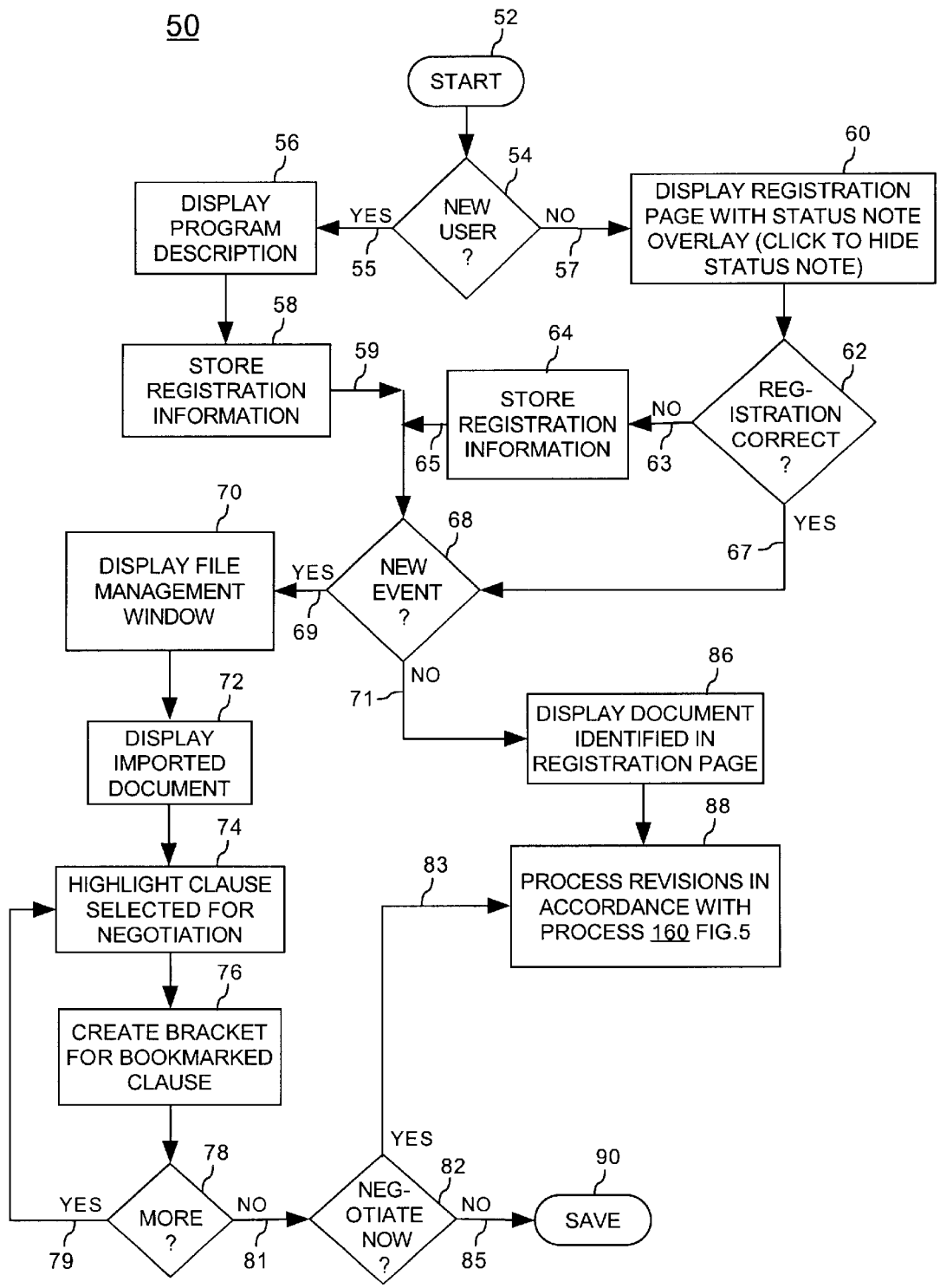
FIG. 2 is a flow chart illustrating a method for initiating negotiations in accordance with the inventive arrangements, from a host, server and application perspective.

The negotiation management system is intended to facilitate negotiation by users, both new users and existing users. There can be several kinds of new users of the negotiation management system. One kind of new user is a party who is going to participate in an entirely new negotiation event. Another kind of new user is a new party to an existing or ongoing negotiation event. A third kind of new user is usually a prior user with respect to an ongoing negotiation event, who in this particular instance, is going be a party to a new negotiation event. It is also possible that a party not a new user for purposes of participating in an ongoing negotiation event may very well be a new user for purposes of a different negotiating event, which may be new or may be on going with other parties. Illustrating all these possibilities, and others, in the accompanying Figures would unnecessarily complicate the description of the inventive arrangements. For purposes of simplifying the explanation, FIG. 1 contemplates a new user as a party not already involved in an ongoing negotiation, who is going to be a party to a new negotiating event. FIGS. 1 and 2 also contemplate that a person not a new user will be participating in an ongoing negotiating event for which the user has already been registered. With these caveats in mind, reference is made to FIGS. 1 and 2.

FIGS. 1 and 2 are flow charts illustrating a method for initiating negotiations in accordance with the inventive arrangements. FIG. 1 represents the user perspective. FIG. 2 represents the host, server and application perspective.

Figure 7:
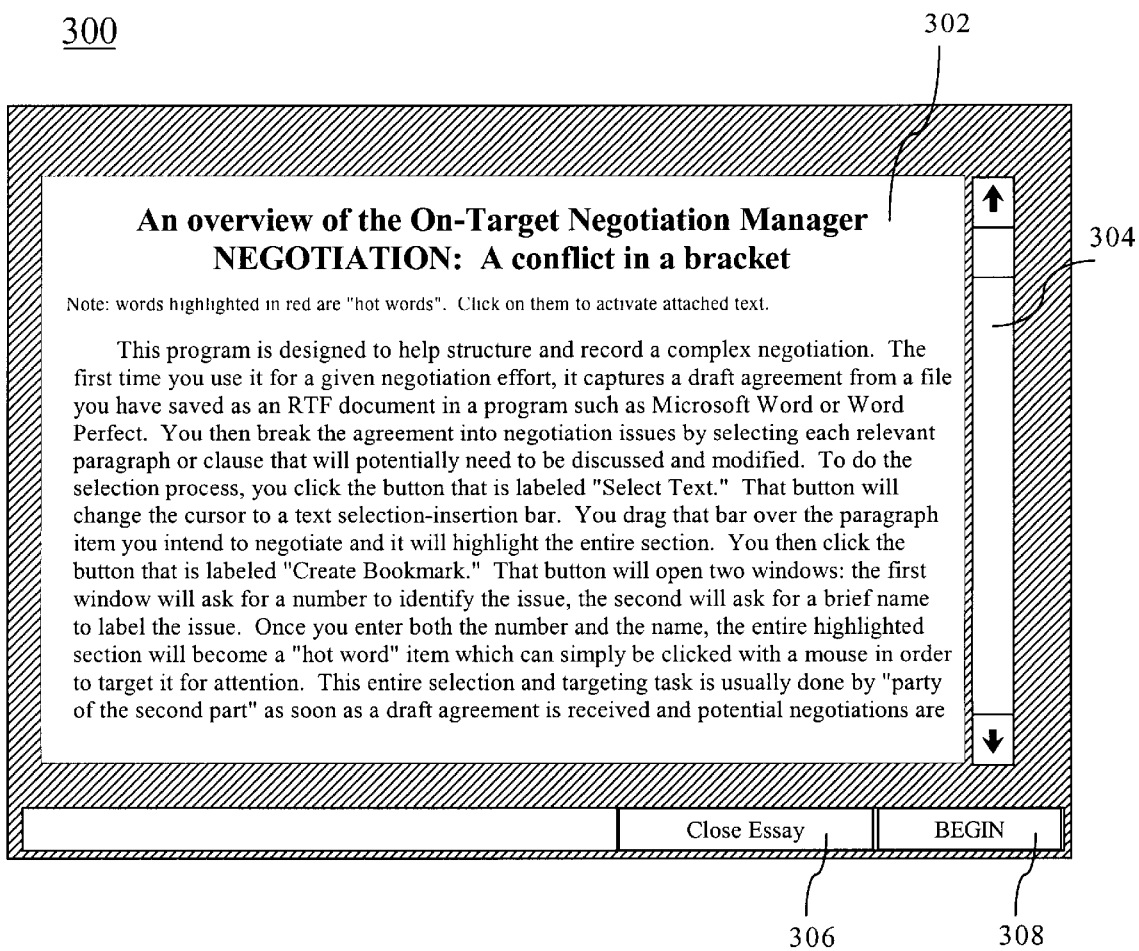
FIG. 7 is an example of a program description screen display generated in accordance with the inventive arrangements.

The method 10 shown in FIG. 1 begins with the step of start block 12. The user must first identify him or herself as a new user of the program or application, that is, the negotiation management system in accordance with the step of decision block 14. If so, the method branches on path 15 to the step of block 16, in accordance with which the user reviews a description or overview of the program. An illustrative description of the program is shown in the screen display 300 of FIG. 7. The overview or description appears in window 302. The user can scroll through the description utilizing the scroll bar control icon 302, and at any time, can use activatable button icons 304 and 306 respectively to close the description and begin negotiations.

Figure 8:
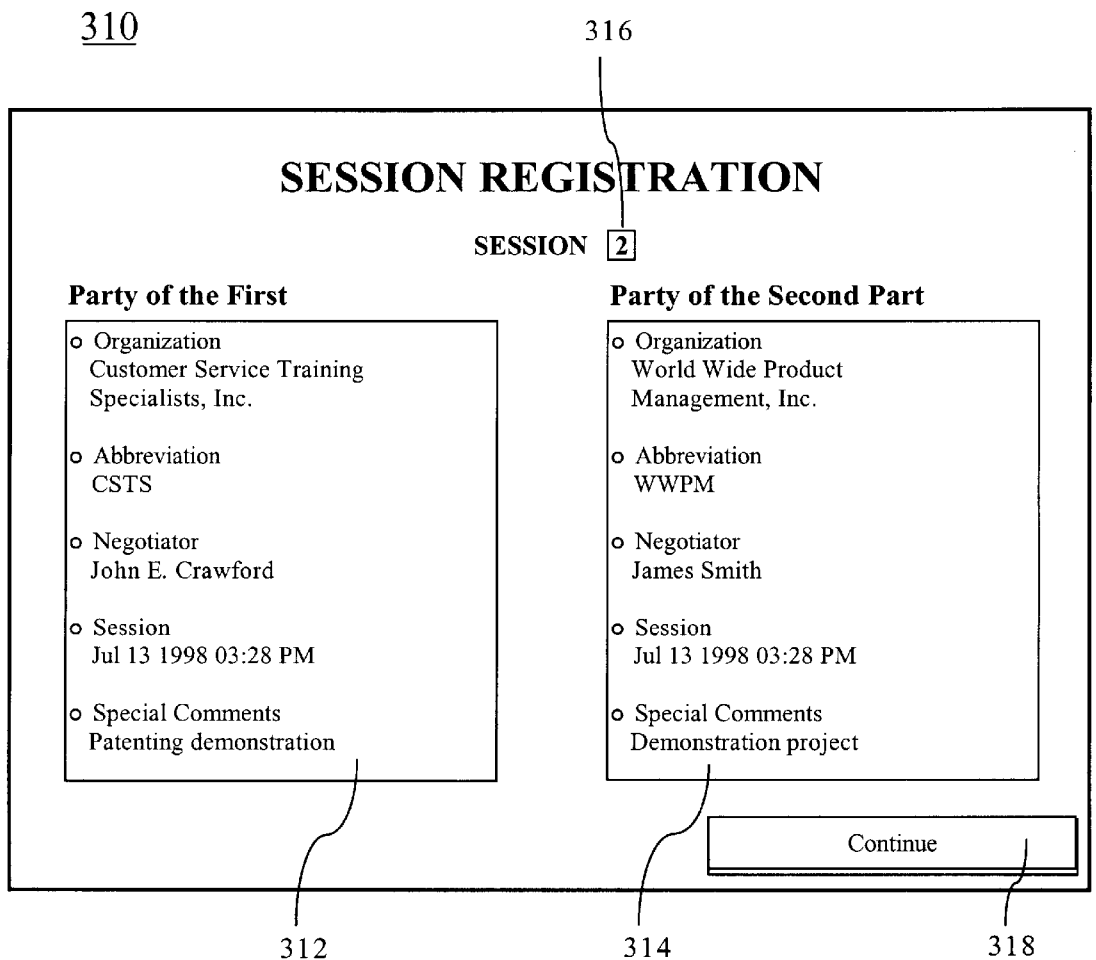
FIG. 8 is an example of a registration screen display generated in accordance with the inventive arrangements.

After reviewing the program description, a new user enters or updates registration information in registration page in accordance with the step of block 18. An illustrative illustration page is shown as screen display 310 in FIG. 8. Screen 310 includes respective windows 312 and 314 for entering and storing bibliographic information regarding the two parties negotiating an agreement. It is possible to have more than two parties, but only two parties are considered herein for purposes of simplifying the explanation. Sections 310 and 312 are provided for identifying the parties of the first and second parts, respectively. For purposes of definition, it is assumed herein that the party of the first part supplies the base document, that is the first working draft, of the proposed agreement which will be negotiated between the parties. Each of the sections provides an opportunity to identify the name of the organization, an abbreviation for the organization, the name of the chief negotiator, the date and time of the particular negotiation session and any special comments, which might be a brief description of the nature of the agreement. A section 316 identifies which session the parties are registering for. For new users who are beginning a new negotiating event, this screen will identify session 1. The user can proceed from screen 310 by pressing continue icon button 318.

With reference back to FIG. 1, if the person is not a new user, the method branches on path 17 to the step of block 20, in accordance with which the registration page and a status note overlying the registration page can be reviewed. Such a status note overlay 320 is shown in FIG. 9.

After reviewing the registration page and status note, a determination is made as to whether or not registration is correct in accordance with the step of decision block 22. If the registration information is not correct the method branches on path 23 to the step of block 24, in accordance with which the registration information is corrected or otherwise updated. If the registration is correct, the method branches on path 27 to the step of decision block 28. For the new user, who entered registration information in connection with the step of block 18, the method proceeds on path 19 to the step of decision block 28. For the person updating registration information in accordance with the step of block 24, the method proceeds on path 25 to the step of decision block 28.

Decision block 28 requires the user to indicate whether or not a new negotiating event is being initiated, or whether an ongoing negotiating event is to be revisited.

For a new negotiating event, the user, in this case the party of the first, imports a base document into a file management window. It is understood that many different word processing programs are utilized around the world. Documents created by these programs are not directly compatible, but the programs have tools for converting documents to import from and export to other programs. Documents in virtually every word processing program commonly available can be converted to and from rich text format. Accordingly, in the presently preferred embodiment, the negotiation management system operates in rich text format.

Figure 10:
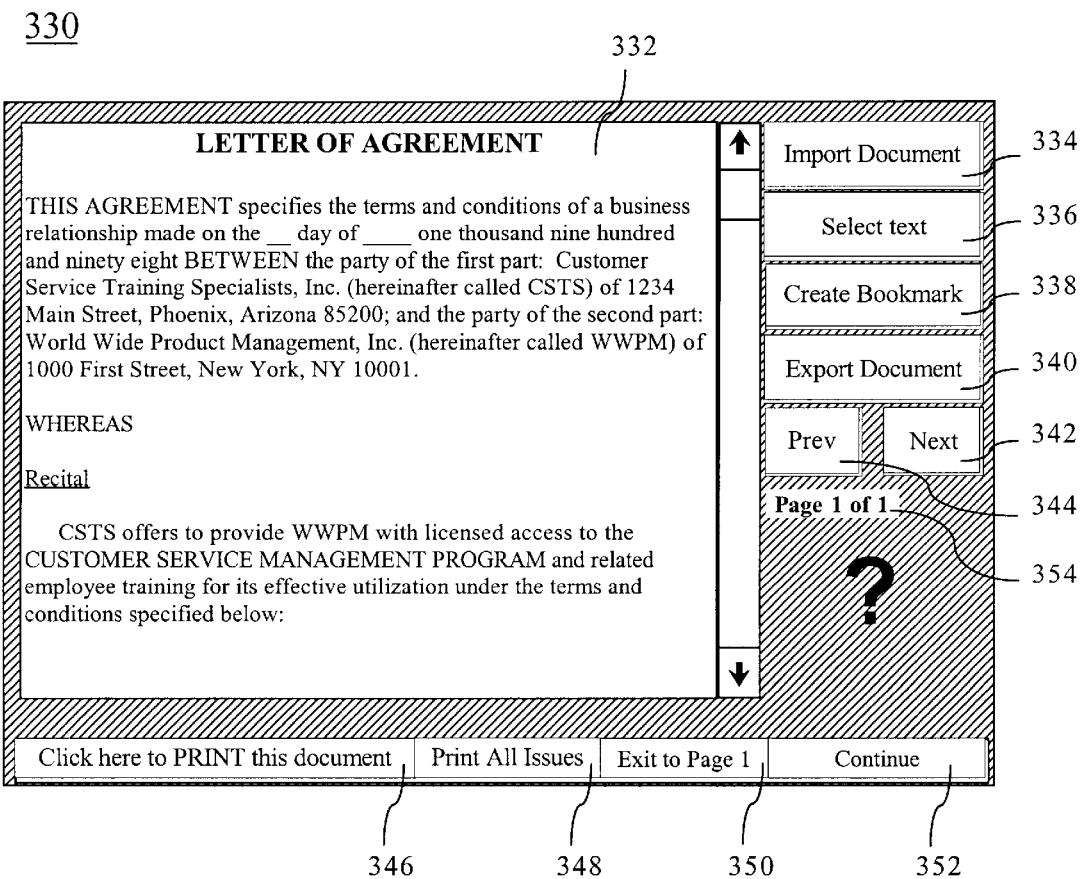
FIG. 10 is an example of a file management screen display generated in accordance with the inventive arrangements.

A file management screen display 330 is shown in FIG. 10. Screen display 330 has large window 332 in which the document appears, and can be viewed by scrolling. The document can be imported by activatable icon button 334, which can invoke a computer storage media browser in the conventional fashion.

After the document has been imported, various clauses can be highlighted in accordance with the step of block 32, by highlighting with the curser and activating icon button 336. If a selected clause is to be negotiated, it is book marked in accordance with the step of block 34 to create a bracket, explained hereinafter, by utilizing activatable icon button 338.

In accordance with the step decision block 36, the steps of blocks 32 and 34 and movement along path 37 are repeated, until all clauses to be negotiated have been highlighted and bookmarked. When the user is finished highlighting and book marking clauses, the method branches on path 39 to the step of decision block 40. If the user wishes to initiate negotiations, the method branches on path 41 to the step of block 44, in accordance with which clauses are revised in accordance with the processes 100 and 140 explained hereinafter in connection with FIGS. 3 and 4.

If an existing user or a new user indicates that an ongoing negotiation event is to be accessed, the method branches on path 31 from decision block 28 to the step of block 42, in accordance with which the document shown in the file management window is reviewed. Thereafter, the method moves to the step of block 44, explained above. If the party creating the bookmarks does not wish to negotiate at that time, the method branches on path 43 to the step of block 46, in accordance with which the method is terminated, at least until negotiations resume at a later date or time.

With reference to FIG. 10, at various stages of the negotiation, it may be helpful to export the document by activating icon button 340, to move from page to page using the previous and next activatable icon buttons 342 and 344, to print the document using activatable icon button 346, to print all issues by using activatable icon button 348, to exit to page 1 by activating icon button 350 or to continue by activating icon button 352. As the user moves through pages of the document, the pages are tracked by display 354.

FIG. 2 illustrates the steps undertaken by the host, service provider or application to enable the user steps shown in FIG. 1. In view of this correspondence, the method 50 illustrated in FIG. 2 can be explained in a more perfunctory manner, as the details correspond to the steps explained in connection with method 10 albeit from a different perspective.

From start block 52, the application responds to identification of a new user at decision block 54 by branching on path 55 to the step of block 56, in accordance with which a program description displayed. Thereafter, registration information provided by the new user is stored in connection with the step of block 58. The method then moves on path 59 to the step of decision block 68, in accordance with which the application receives information as whether or not a new negotiating event is to take place.

The application responds to an existing user by branching on path 57 to the step of block 60, in accordance with which the registration page is displayed with the status note overlay 320 as shown in FIG. 9. If the registration information is correct, the method branches on path 67 to the step of decision block 68. If the registration information is not correct, the method branches on the step of block 63 to the step of block 64, in accordance with which updated registration information is stored.

If a new negotiating event is to take place, the method branches on path 69 to step of block 70, in accordance with which the application displays the file management display screen 320 shown in FIG. 10. Thereafter, the application imports the base document in accordance with the step of block 72.

The application enables text highlighting, text selection and the creation of brackets, as necessary, in accordance with the steps of blocks 74, 76 and 78, and path 79, provided that more clauses need to be highlighted and bracketed. If no more clauses need to be highlighted and bracketed, the method branches on path 81 from decision block 78 to the step of decision block 82, in accordance with which the application is advised by the user as to whether negotiations will proceed. If so, the application initiates the steps of process 160 explained in connect with FIG. 5, in accordance with the step of block 88.

If the user indicates that an existing or ongoing negation event is to be accessed at decision block 68, the method branches on path 71 to the step of block 86, in accordance with which the application displays the document identified in the registration page. Thereafter, the application implements process 160 as explained in connection with FIG. 5.

If negotiations are not to take place, the method branches on path 85 to the step block 90, in accordance with which highlighting and bracketing of the clauses is saved. FIG. 11 is another view of display screen 330, in which the base document has been scrolled to show three clauses and part of a fourth clause. The base document appearing in window 332 is an instance in which visual coding is employed for the purpose of navigating through the document during negotiations and for the purpose of managing the negotiation process throughout, as well as for the purpose of reviewing the negotiation process after negotiations have concluded.

The visual coding is employed to distinguish between negotiable and negotiated clauses in different stages of the negotiation process. One aspect of the visual coding is to distinguish between clauses that have not yet been negotiated and clauses have been agreed to. Another aspect of visual coding is to distinguish those proposals made by the party of the first part from those proposals made by the party of the second part. If one were returning to an ongoing negotiating session after a break of some period of time, for example days or even weeks, it is extraordinarily helpful to be able, for example, to scroll through the base document in window 332 and on the basis of visual coding easily and quickly determine which clauses have yet to be negotiated, which clauses have been agreed to, and with respect to those clauses which are been negotiated but for which negotiations have not been concluded, which is the party to have made the last proposal.

With respect to text, visual coding can be implemented in a number of different ways, including, for example: foreground color, background color; font face; font style; borders; and, brackets. In the presently preferred embodiment, visual coding is implemented by the foreground or background color of the text or both. In accordance with this presently preferred embodiment, clauses which have not yet negotiated are displayed in black foreground color over a white background color. Clauses which have been agreed to are displayed in green foreground color over a white background color. Clauses which are still being negotiated, and in which the present proposal originated with the party of the first part, are visually coded by a blue foreground color over a white background color. Similarly, clauses still being negotiated in which the present proposal originated with the party of the second part are visually coded by red foreground color over white background color.

It will be appreciated that this presently preferred scheme for visual coding cannot be directly illustrated in the drawings. Accordingly, applicants are utilizing cross-hatched circles and lead lines to denote the visual coding. Clause 1 is illustrated as green, namely agreed to. Clause 1.1 is illustrated as blue, namely as proposed by the party of the first part. Clause 1.2 is illustrated as red, namely as proposed by the party of the second part. Clause 2 is illustrated as black, namely a clause which has not yet been negotiated. Alternatively, for example, the cross-hatching for green can represent underlined text, the cross-hatching for blue can represent bold text and the cross-hatching for red can represent italic text.

Figure 12:
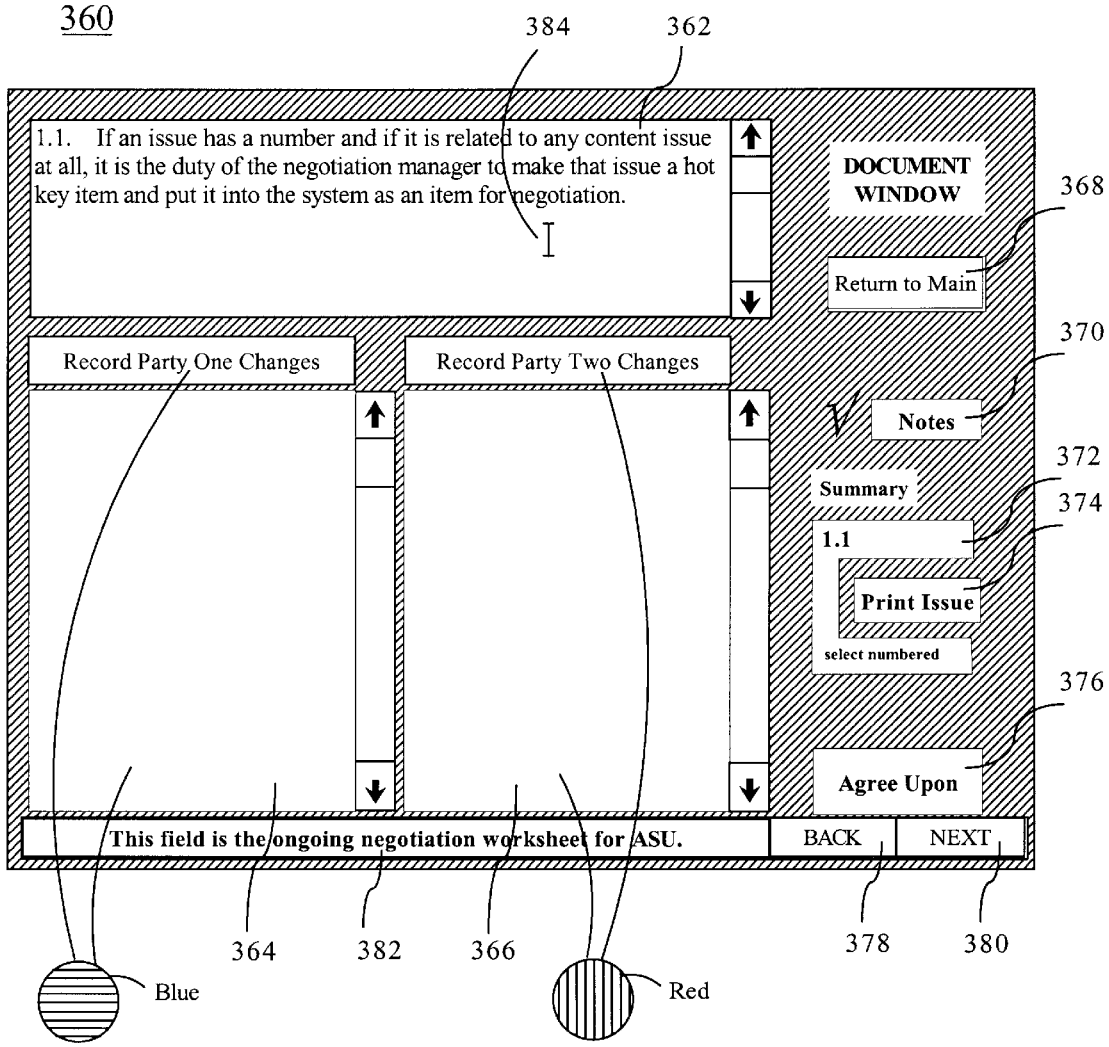
FIG. 12 is an example of a clause modification screen display generated in accordance with the inventive arrangements.

Clauses of the base agreement which are "bracketed", a term of art for purposes of this description, appear individually in a clause modification screen display 360 as shown in FIG. 12. The text of a clause of the base document is shown in a window 362. Modifications made by the party of the first part appear in window 364 and modifications made by the party of the second appear in window 366. Windows 364 and 366 can be arranged like a two column table in a word processing document, and the modification by each party can appear on alternate rows to facilitate easy tracking of the proposals and counter proposals. Each of these proposals and counter proposals is stored as part of the permanent record of the negotiations, so that the developments leading up to any agreed upon clause can be reviewed at a later time by the parties and by the parties' managers.

Display screen 360 has a number of activatable button icons in addition to the text display windows. Button 368 is used to return to the main agreement, as in FIG. 11. Button 370 accessed a notes window, explained in more detail below. Activatable icon 372 is a bracket identifying the clause being negotiated and providing access to the issue summary display screen, explained in more detail below. Button 374 enables the entire record at the issue negotiations to be printed. Button 376 indicates the clause has been agreed to insofar as it can be used to initiate renegotiation. Buttons 378 and 380 are used to access the previous and next display screens 360 for the previous and next clauses. Window 382 provides a brief explanation for each window and button over which the cursor 384 is placed.

Figure 13:
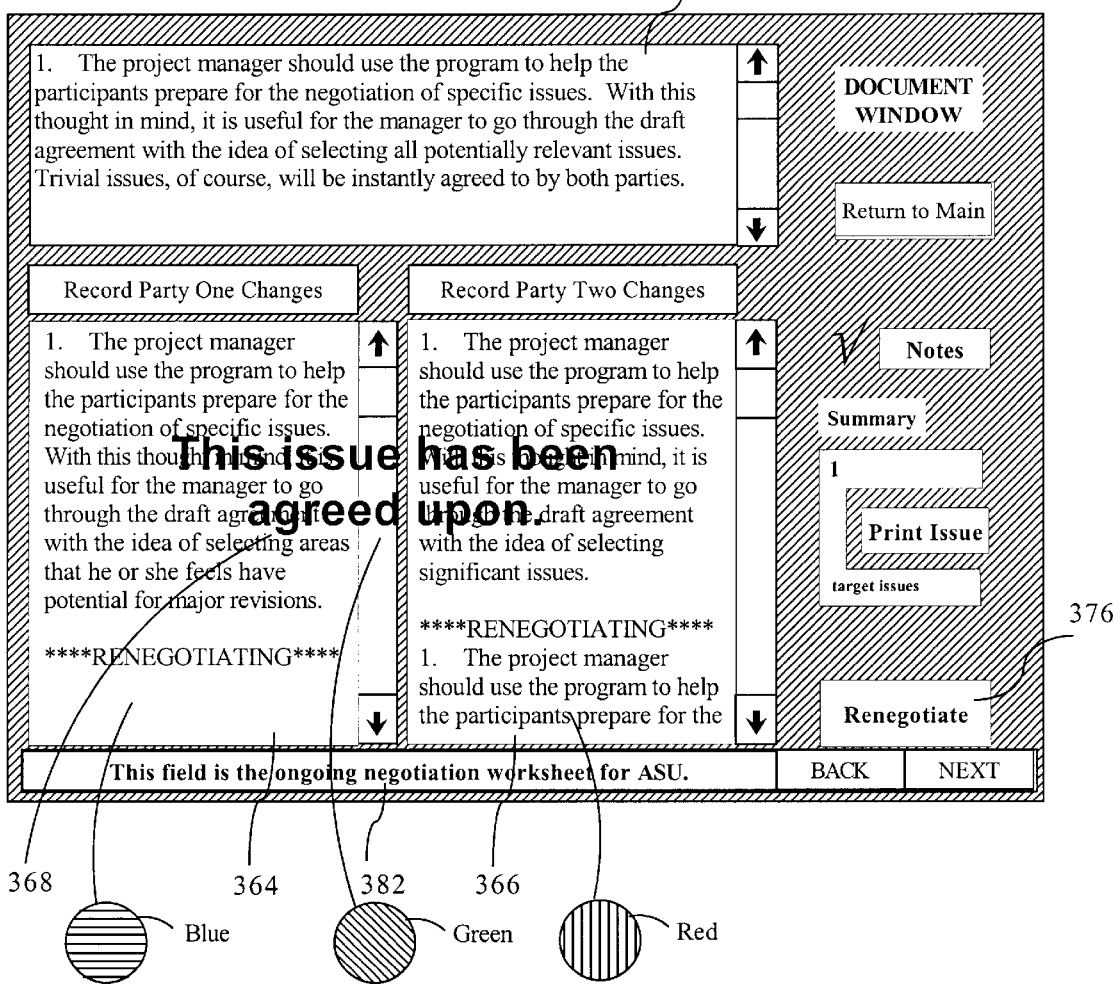
FIG. 13 is an example of visual coding as applied to the clause modification screen display shown in FIG. 12.
Figure 14:
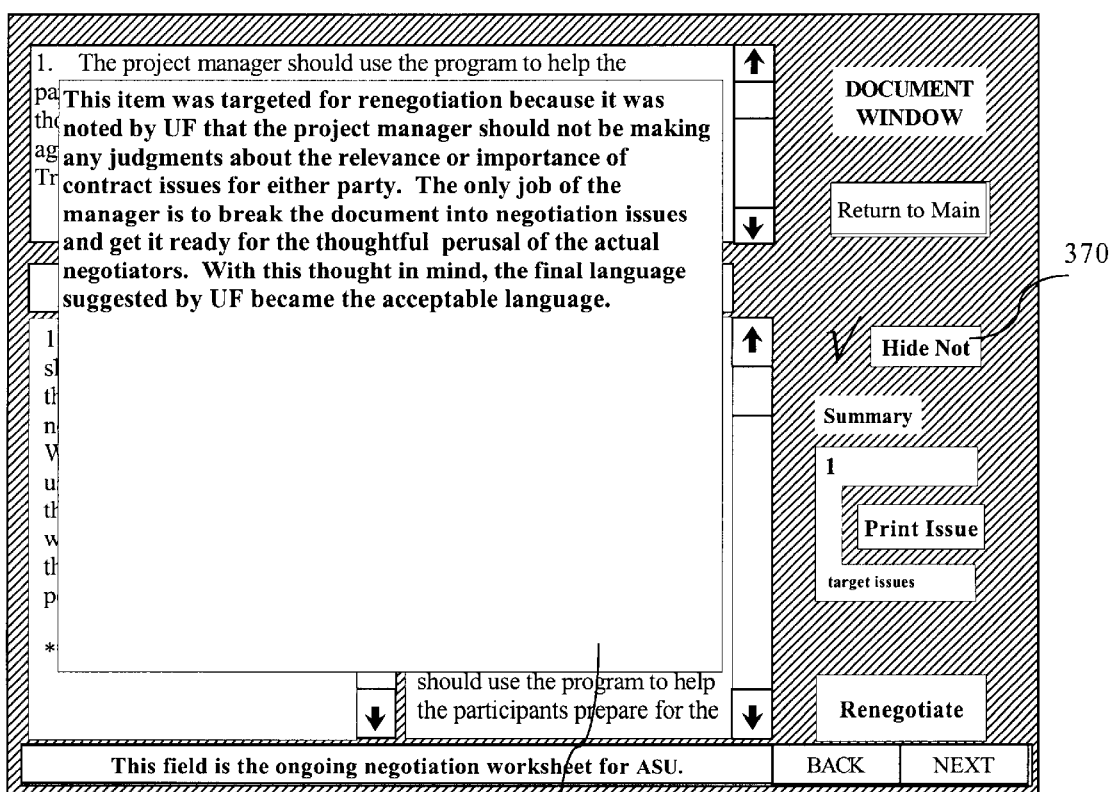
FIG. 14 is an example of a notes screen display generated in accordance with the inventive arrangements.

FIG. 13 shows display screen 360 with proposals by the parties. In display screen 360, the visual coding is illustrated by background color. In window 364 the proposals of the party of the first part are black foreground over a blue background. In window 366 the proposals of the party of the second part are black foreground over a red background. In this case, the final proposal has been accepted, so that a message 368 overlays both windows 364 and 366 to indicate the issue has been agreed to. The message 368 is visually coded by a green foreground color, consistent with the visual coding of clause 1 in FIG. 11. Since the clause has been agreed to, button icon 376 can now be used to initiate renegotiation of the clause. During the course of the negotiations it is common for the negotiating parties to make notes pertaining to choices of language and terms, and perhaps explaining how an agreement in one clause is link to a comprise and depended upon a comprise in another clause. Notes can be accessed by activating button icon 370, and each time the button is activated a notes display window 388 is displayed by the application as shown in FIG. 14. These notes also become a permanent part of the record of the negotiations, and can be referred at a later time where clarification of reasons and positions is helpful. When the note is displayed, button icon 370 can be used to hide the note.

Figure 15:
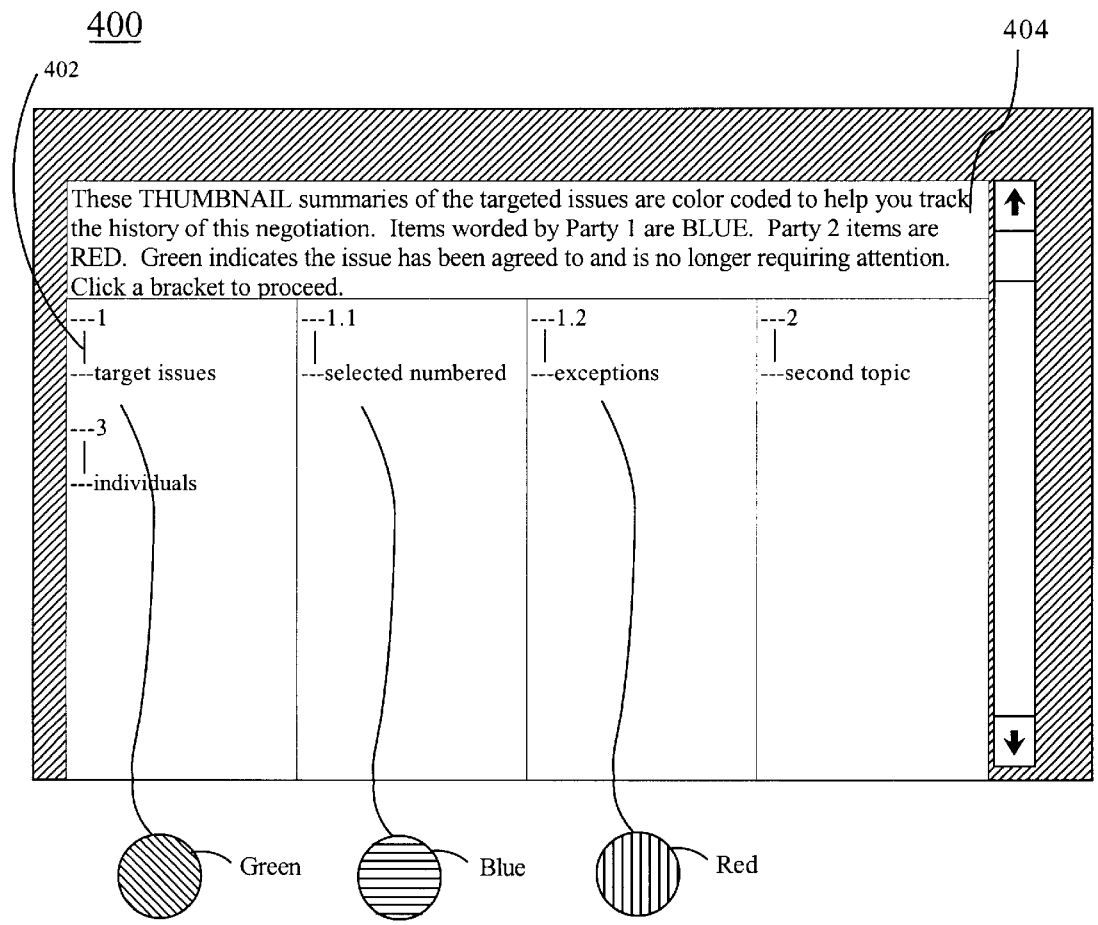
FIG. 15 is an example of a summary page screen display with visual coding.

Negotiating activity can also be tracked by a summary page, shown as display screen 400 in FIG. 15. Each clause is denoted by a bracket. Each bracket has a clause identifier, for example, 1, 1.1, 1.2, and 2. Each clause also has a code word or summary description, for example, target issues, select numbered, exceptions and second topic. Each bracket, clause identifier and code word is visually coded consistent with the display screen described above. Each bracket is also an activatable icon which can be used to display the screen 360 for that particular clause. Instructions can be provided in window 404.

Figure 3:
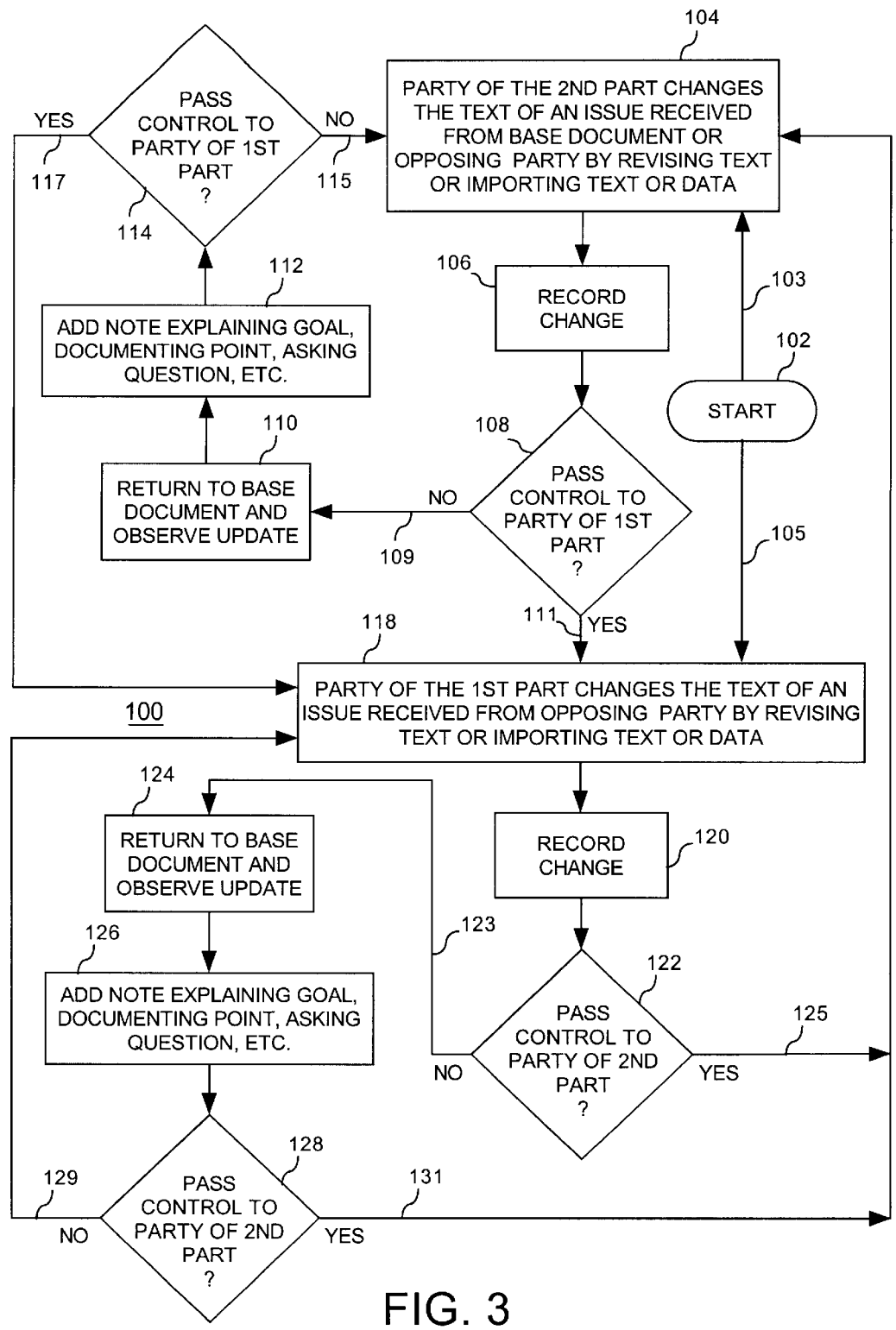
FIGS. 3 and 4 are flow charts illustrating a method for implementing ongoing negotiations in accordance with the inventive arrangements, from the user perspective.

The negotiating method 100 employed by the parties is illustrated in FIG. 3. An understanding of the method 100 is facilitated by reference back FIGS. 10–15 described in detail above. From start block 102, negotiations can begin with the party of the second part, following path 103, or by the party of the first part, following path 105. If this is the first session of negotiation of clauses by the parties, and on the assumption that the base document has been provided by the party of the first part, it is expected that negotiations will commence when the party of the second part changes the text of an issue received from the base document. In the event that negotiations of a particular clause are in progress, the party of the second part will change the text received from the opposing party, in accordance with the step of block 104. In either event, the text can be changed by revising the text through keyboard entries, by importing text from an external source or by importing data from an external source. An example of importing text is copying standard clauses from compendia of such clauses, which can be made available to the application. An example of importing data is an amortization table or a corporate evaluation, one based for example, on the 25% rule. This facilitates the inclusion of very detailed language where necessary, without incurring the delays normally incurred in making extensive revisions. Once the party of the second part is satisfied with the changes, the changes are recorded in accordance with the step of block 106. This places a copy of the modified clause language into the appropriate line of the window 366 in display screen 360 shown in FIG. 13. If the party of the second part is not ready to pass control to party of the first, in accordance with step decision block 108, the method branches on path 109 to step of block 110, in accordance with which the party of the second part returns to the base document and observes the update. Thereafter, the party of the second part may choose to add a note explaining goals, documenting a point, asking a question for later reference and the like, in accordance with step of block 112. If the party of the first part is still not ready to pass control to the party first part, in accordance with the step of decision block 114, the method branches on path 115 back to the step of block 104, in accordance with in which the party of the second part changes the text of another issue to be negotiated. If the party of the first part is prepared to pass control to the party of the second part in accordance with the step of decision block 108, or in accordance with the step of decision block 114, the method branches on paths 111 and 117 respectively to the step of block 118, in accordance with which the party of first part changes the text of an issue received from the opposing party by revising text or importing text or data. The difference in steps between blocks 104 and 118 are based on the assumption that the party of the first part will not want to change its own proposed language, thereby negotiating with itself before the party of the second part has an opportunity to respond.

In the same manner as the party of second part, the party of the first part can record changes in accordance with the step of block 120, and has an opportunity to pass control or not pass control to the party of second part in accordance with step of decision block 122. If control is not passed, the party of the first part has an opportunity to return to the base document and observe the update in accordance with the step of 124, and has an opportunity to add a note relevant to the proposed modification in accordance with the step 126. If the party of the first part is still not prepared to pass control to the party of the second part, in accordance with the step of decision block 28, the method branches on path 129 back to 118, in accordance with which the party of the first part changes of the text of another clause modified by the party of the second part.

When the party of the first is prepared to pass control to party of the second part, in accordance with steps of decision blocks 122 or 128, the method branches on paths 125 and 131 respectively back to block 104.

It will be appreciated that many variations are possible, and that during the course of proposing each modification, many alternatives are available. In any case, FIG. 3 provides an explanation of those steps which each party will be entitled to take during which the course of the negotiations, and those times during which the parties will not be able to make changes or modifications.

Figure 4:
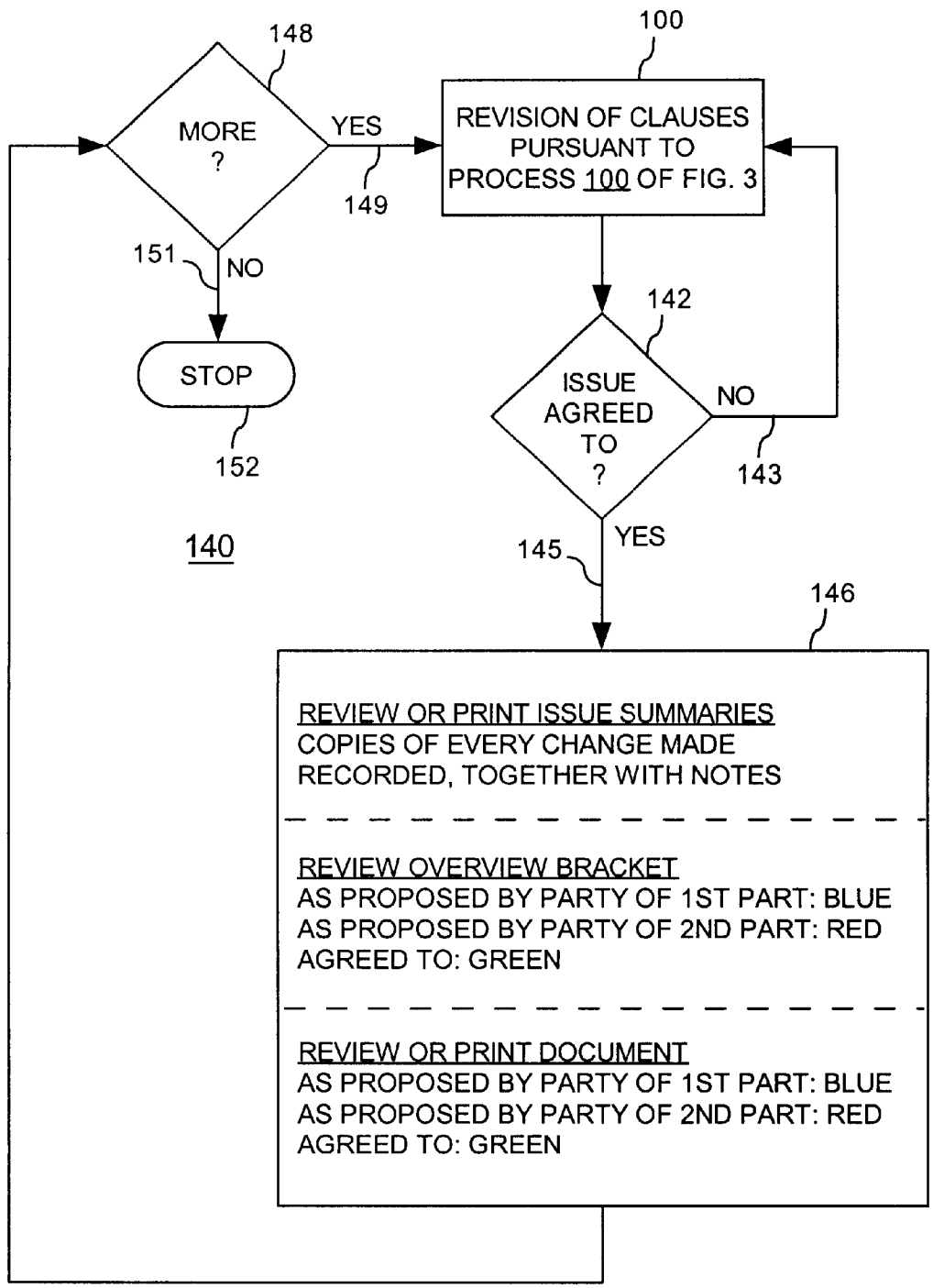

The method 100 continues in accordance with method 140 shown in FIG. 4. The starting point of method 140 is a block labeled 100, which makes reference to the revision of clauses to process 100 in FIG. 3. If no issue has been agreed to in accordance with the step decision 142, the method returns to block 100 by path 143 in order to continue the back and forth revision of clauses until agreement as to a least one clause has been reached.

If an issue has been agreed to, the method branches on path 145 to one or more of the steps of block 146. In accordance with block 146, the parties have the option to review or print issue summaries, knowing that copies of every change made have been recorded together with notes related thereto. The parties have the option of reviewing the overview bracket, which is an opportunity to review each of the proposals and counter proposals made by the parties, as visually coded for easy reference. The parties also have an opportunity to review or print the document, which is also visually coded, in order to provide a record of what has been agreed to, what needs to be negotiated and what is in the midst of being negotiated. Once any or all of steps have been taken, the step of decision block 148 asks whether there are more clauses to be negotiated. If there are, the method branches on path 149 back to block 100. If there are no more clauses to negotiate, or if the parties are simply prepared to suspend negotiations for whatever reason, the method branches on path 51 and stops in accordance with the step of 152.

Figure 5:
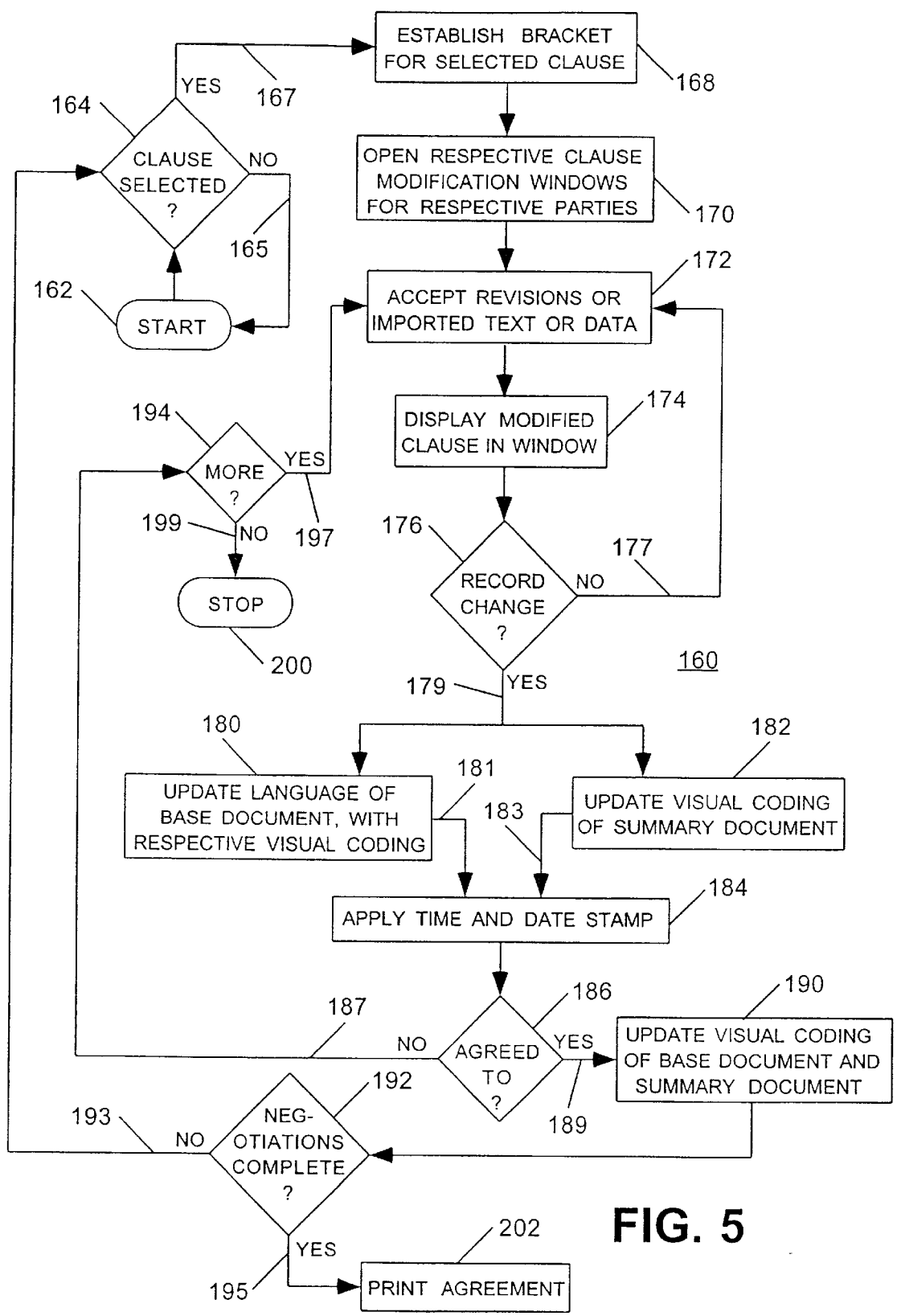
FIG. 5 is a flow chart illustrating a method for implementing ongoing negotiations in accordance with the inventive arrangements, from the server/application perspective.

The steps of method 160 shown in FIG. 5 represents the steps undertaken by the application or server to enable the user to undertake the negotiating steps described in connection with FIGS. 3 and 4. It can be appreciated from comparing the steps of the flow charts in FIGS. 3 and 4 to the steps of the flow chart in FIG. 5 that the method is considerably less complex and more straight forward from the perspective of the application or server provider. It is a particular advantage of the inventive arrangements that a relatively simple method employed by the application or server can accommodate all of the possible variations shown in FIGS. 3 and 4, as well as numerous alternatives which are not shown in FIGS. 3 and 4 for purposes of clarification of the description of inventive arrangement.

Method 160 is less complex, for most part, because the steps are taken essentially irrespective of which party is invoking the program at any particular point. From start block 162, the application questions whether a clause has been selected for negotiation in accordance with the step of decision block 164. If no clause has been selected, the method branches on path 165 back to start block 162 and waits. Once a clause had been selected, the method branches on path 167 to the step of block 168, in accordance with which the application establishes a bracket for the selected clause. Thereafter, in accordance with the step of block 170, the application opens a respective clause modification screen, as shown for example in FIGS. 12–13, for each of the respective parties. The application then accepts revisions or imported text or data in accordance with the step of block 172, and displays the modified clause in the appropriate window in accordance with the step of block 174. If the application is not instructed to record the change in connection with the step of decision block 176 the method returns on path 177 to step of block 172, in accordances with the application accepts further revisions or imported text or data. If the changes is to be recorded, the method branches on path 179 to each of the steps of blocks 180 and 182, which can be completed serially, in any order, or in parallel. In accordance with the step of block 180, the language of the base document is updated together with respective visual coding. In accordance with the step of block 182, the visual coding of the summary document is updated. Paths 181 and 183 from blocks 180 and 182 respectively lead to the step of block 184, in accordance with which a time and date stamp is applied to each recorded change. Thereafter, the application needs to know if the clause has been agreed to, in accordance with step of decision block 186. If no agreement has been reached, the method branches on path 187 to the step of decision block 194, which questions whether or not more clauses will be modified. If more clauses are to be modified, the method branches on path 197 to the step of block 172, in accordance with which revisions are accepted from the other party. If no more clauses are to be negotiated, the method branches on path 199 to block 200 and stops.

If the clause has been agreed to, the method branches on path 189 to the step of block 190, in accordance with which the visual coding of the base document and summary document are updated. Thereafter, the application needs to know whether or not the negotiations have been completed, in accordance with step of decision block 192. If the negotiations have not been completed, the method branches on path 193 to the step of decision block 164, and waits for selection of another clause for negotiation. If the negotiations have been completed, the method can branch on path 195 to step of block 202 in accordance with which a final agreement can be printed.

Figure 6:
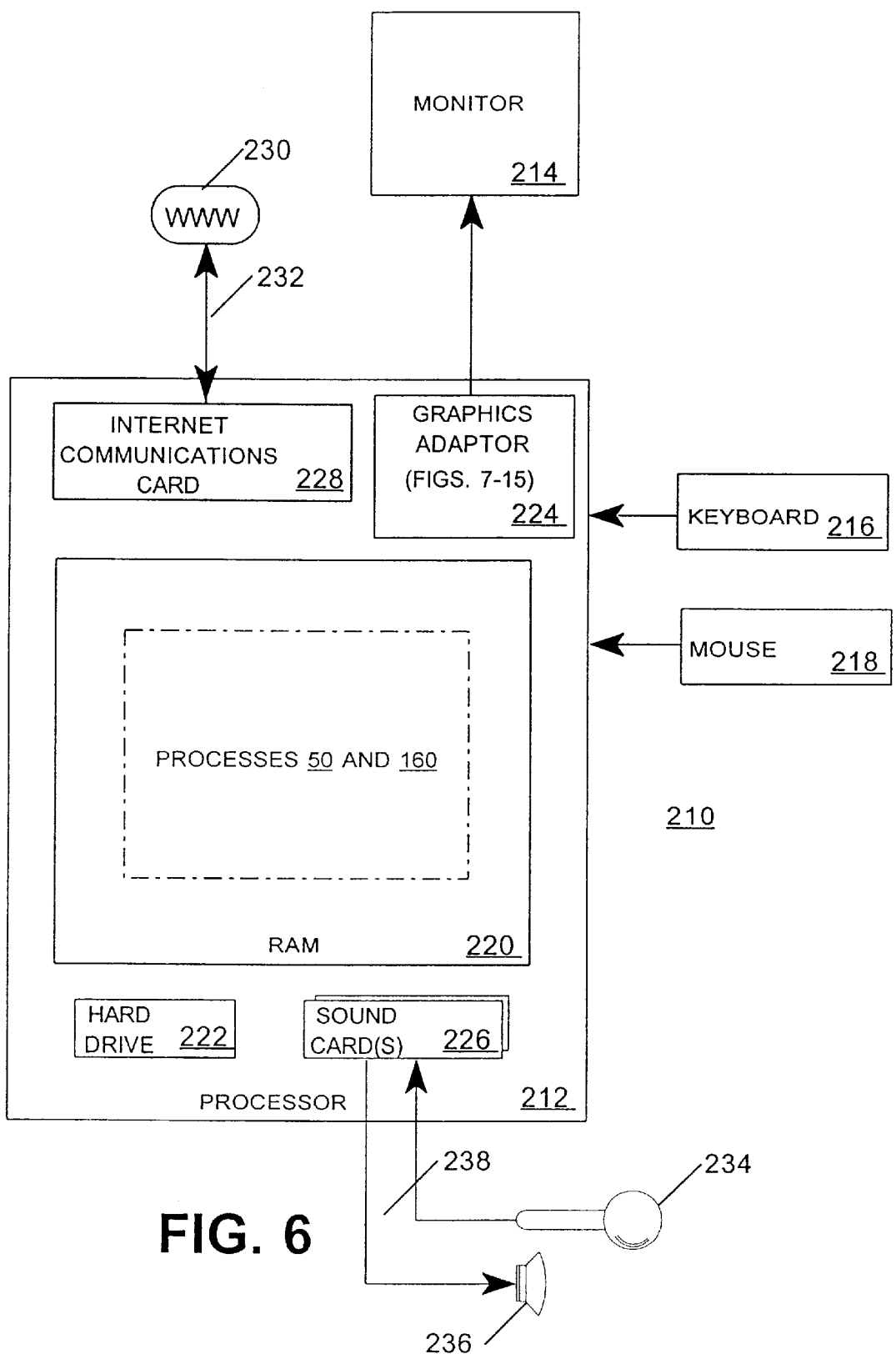
FIG. 6 is a block diagram of a computer apparatus programmed with a routine set of instructions stored in a fixed medium for implementing the inventive arrangements, both for parties and for service providers.

FIG. 6 shows a computer apparatus 210 which can be programmed with a routine set of instructions stored in a fixed medium for implementing each of the methods shown in FIGS. 1–5, and for generating each of the screen displays shown in FIGS. 7–15. The computer apparatus 210 comprises a processor 212, a monitor 214, a keyboard 216 and a mouse 218. The processor 212 further comprises a random access memory (RAM) 220, a hard drive 222, a graphics adaptor 224, one or more sound cards 226 and an Internet communications card 228. The Internet communications card 228 enables the communications link 232 to be established with the worldwide web 230. The one or more sound cards 226, together with a microphone 234 and a speaker or earphone 236, define an audible user interface for implementing the various methods by voice command, as well as by keyboard or mouse command. Ram 220 is shown as being programmed with the necessary set of instructions for implementing processes 50 and 160, which represent managing negotiations from the perspective of the application or service provider.

A negotiation management system in accordance with the inventive arrangements can be embodied as a software application. The application can be loaded on a single computer, with the parties taking turns at controlling the user interfaces. A projection screen can be used to facilitate viewing the document, clauses and summaries by all present. Alternatively, computers of respective parties can be loaded with the software and linked by direct cable or by a local area network. Negotiations can proceed in the same room or different rooms. As a further alternative, the software can be loaded on computers in offices of respective parties and the documents created and revised during negotiation can be transmitted back and forth between the parties by disk, modem or the Internet. As yet another alternative, the software can be loaded on a computer forming all or part of an Internet web site, which becomes a virtual conference center where the documents of many negotiations can be stored. The parties can log on to the web site, simultaneously or serially, and participate in negotiation events without having to load the software on their own computers. This last arrangement is particularly amenable to importing clause language from various compendia and financial and other data from other sources. It can be sufficient to provide Internet links to such sources if such sources cannot be stored at the web site for any reason. It will be appreciated that the negotiating management system taught herein can be utilized in numerous ways, even in addition to those noted specifically herein as examples of use which are expected to be most typical.

What is claimed is:

1. A method for managing negotiations between parties, comprising the steps of:
   storing a selected document having a plurality of negotiable clauses;
   creating a first retrievable display relating to said document;
   updating said document as said clauses are modified by said parties, so that each said clause corresponds to the last of said modifications;
   visually coding said first retrievable display to identify clauses which have not been negotiated, whereby said negotiations can be tracked by reviewing said visually coded display;
   creating a plurality of respective retrievable clause displays for all said modifications of said clauses as each said clause is negotiated;
   visually coding said plurality of respective retrievable clause displays so that said modifications are attributable to respective ones of said parties;
   creating a retrievable summary display for all said clauses, each said clause being represented by a summary identifier; and,
   visually coding each said summary identifier consistent with said step of visually coding said plurality of respective retrievable clause displays.

2. The method of claim 1, comprising the step of visually coding by at least one of:
   foreground color;
   background color;
   font face;
   font style;
   borders; and, brackets.

3. The method of claim 1, wherein said step of creating retrievable displays of modifications of said clauses comprises the steps of:
   linking to at least one source of selectable clauses; and,
   copying selected ones of said selectable clauses to implement said modifications.

4. A method for managing negotiations between parties, comprising the steps of:
   storing a selected document having a plurality of negotiable clauses;
   creating a first retrievable display relating to said document;
   updating said document as said clauses are modified by said parties, so that each said claus corresponds to the last of said modifications;
   visually coding said first retrievable display to identify clauses which have not been negotiated, whereby said negotiations can be tracked by reviewing said visually coded display;
   creating a retrievable summary display for all said clauses, each said clause being represented by a summary identifier; and,
   visually coding each said summary identifier consistent with said step of visually coding said first retrievable display.

5. A method for managing negotiations between parties, comprising the steps of:
   storing a selected document having a plurality of negotiable clauses;
   creating a first retrievable display relating to said document;
   updating said document as said clauses are modified by said parties, so that each said clause corresponds to the last of said modifications;
   visually coding said first retrievable display to identify clauses which have not been negotiated and to distinguish between clauses which have not been negotiated and clauses which have been agreed to, whereby said negotiations can be tracked by reviewing said visually coded display;
   further visually coding said first retrievable display so that those of said updated clauses which have not yet been agreed to are attributable to one of said parties;
   creating a plurality of respective retrievable clause displays for all said modifications of said clauses as each said clause is negotiated;
   visually coding said plurality of respective retrievable clause displays so that said modifications are attributable to respective ones of said parties;
   creating a retrievable summary display for all said clauses, each said clause being represented by a summary identifier; and,
   visually coding each said summary identifier consistent with said steps of visually coding said first retrievable display and visually coding said plurality of respective retrievable clause displays.

6. The method of claim 5, comprising the step of visually coding and further visually coding by at least one of:
- foreground color;
- background color;
- font face;
- font style;
- borders; and,
- brackets.

7. The method of claim 5, further comprising the step of recording retrievable notes relating to respective ones of said negotiated clauses.

8. The method of claim 5, further comprising the step of storing all information recorded in connection with said negotiations in at least one data file, whereby said at least one data file can be sent back and forth between said parties.

9. The method of claim 5, further comprising the steps of:
- storing all information recorded in connection with said negotiations on an Internet web site; and,
- enabling access to said information by said parties over the Internet.

10. A method for facilitating negotiations, comprising the steps of:
- enabling at an Internet web site a selection of a document having a plurality of negotiable clauses;
- creating at said Internet web site a first retrievable display related to said document;
- providing authorized parties access to said retrievable display over said Internet;
- updating said document as said clauses are modified during said negotiations, so that each said clause corresponds to the last of said modifications;
- visually coding said first retrievable display to identify clauses which have not been negotiated, whereby said negotiations can be tracked;
- creating a retrievable summary display for all said clauses, each said clause being represented by a summary identifier; and,
- visually coding each said summary identifier.

11. A method for facilitating negotiations, comprising the steps of:
- enabling at an Internet web site a selection of a document having a plurality of negotiable clauses;
- creating at said Internet web site a first retrievable display related to said document;
- providing authorized parties access to said retrievable display over said Internet;
- updating said document as said clauses are modified during said negotiations, so that each said clause corresponds to the last of said modifications;
- visually coding said first retrievable display to identify clauses which have not been negotiated, whereby said negotiations can be tracked;
- visually coding said first retrievable display to distinguish between clauses which have not been negotiated and clauses which have been agreed to;
- further visually coding said first retrievable display so that those of said updated clauses which have not yet been agreed to are attributable to one of said parties;
- creating a retrievable summary display for all said clauses, each said clause being represented by a summary identifier; and,
- visually coding each said summary identifier consistent with said steps of visually coding and further visually coding said first retrievable display.

12. A method for facilitating negotiations, comprising the steps of:
- enabling at an Internet web site a selection of a document having a plurality of negotiable clauses;
- creating at said Internet web site a first retrievable display related to said document;
- providing authorized parties access to said retrievable display over said Internet;
- updating said document as said clauses are modified during said negotiations, so that each said clause corresponds to the last of said modifications;
- visually coding said first retrievable display to identify clauses which have not been negotiated, whereby said negotiations can be tracked;
- creating a retrievable summary display for all said clauses, each said clause being represented by a summary identifier;
- visually coding each said summary identifier;
- creating a plurality of respective retrievable clause displays for all said modifications of said clauses as each said clause is negotiated; and,
- visually coding said plurality of respective retrievable clause displays so that said modifications are attributable to respective ones of said parties.

13. The method of claim 12, comprising the steps of visually coding and further visually coding by at least one of:
- foreground color;
- background color;
- font face;
- font style;
- borders; and,
- brackets.

14. The method of claims 11 or 12, further comprising the step of recording retrievable notes relating to respective ones of said negotiated clauses.

15. The method of claims 11 or 12, further comprising the steps of:
- making sources of selectable clauses available at said Internet web site; and,
- enabling copying of said selectable clauses by said parties to implement said modifications.

16. A computer apparatus programmed with a routine set of instructions stored in a fixed medium, said computer apparatus comprising:
- means for selecting a document having a plurality of negotiable clauses;
- means for creating a first retrievable display relating to said document;
- means for updating said document as said clauses are modified, so that each said clause corresponds to the last of said modifications;
- means for visually coding said first retrievable display to identify clauses which have not been negotiated, whereby said negotiations can be tracked by reviewing said visually coded display;
- means for creating a plurality of respective retrievable clause displays for all said modifications of said clauses as each said clause is negotiated;
- means for visually coding said plurality of respective retrievable clause displays so that said modifications are attributable to respective ones of said parties;
- means for creating a retrievable summary display for all said clauses, each said clause being represented by a summary identifier; and, means for visually coding each said summary identifier consistent with said visually coding of said plurality of respective retrievable clause displays.

17. A computer apparatus programmed with a routine set of instructions stored in a fixed medium, said computer apparatus comprising:

means for selecting a document having a plurality of negotiable clauses;

means for creating a first retrievable display relating to said document;

means for updating said document as said clauses are modified, so that each said clause corresponds to the last of said modifications;

means for visually coding said first retrievable display to identify clauses which have not been negotiated, whereby said negotiations can be tracked by reviewing said visually coded display;

means for visually coding said first retrievable display to distinguish between clauses which have not been negotiated and clauses which have been agreed to;

means for further visually coding said first retrievable display so that those of said updated clauses which have not yet been agreed to are attributable to one of said parties;

means for creating a plurality of respective retrievable clause displays for all said modifications of said clauses as each said clause is negotiated;

means for visually coding said plurality of respective retrievable clause displays so that said modifications are attributable to respective ones of said parties;

means for creating a retrievable summary display for all said clauses, each said clause being represented by a summary identifier; and, means for visually coding each said summary identifier consistent with said visual coding said first retrievable display and said visual coding of said plurality of respective retrievable clause displays.

18. The computer apparatus of claim 17, wherein said visual coding and said further visual coding is by at least one of:

foreground color;
background color;
font face;
font style;
borders; and,
brackets.

19. A method for managing negotiations between parties, comprising the steps of:

storing a selected document having a plurality of negotiable clauses;

creating a first retrievable display relating to the document;

updating the document as the clauses are modified by the parties, so that each clause corresponds to the last of the modifications;

creating a plurality of respective, retrievable clause displays for all the modifications of the clauses as each the clause is negotiated;

creating a retrievable summary display for all the clauses; and, visually coding the retrievable displays to distinguish between clauses which have not been negotiated and clauses which have been agreed to, and so that those of the updated clauses which have not yet been agreed to are attributable to one of the parties, whereby the negotiations can be tracked by reviewing the visually coded displays.

20. A computer apparatus programmed with a routine set of instructions stored in a fixed medium, said computer apparatus comprising:

means for selecting a document having a plurality of negotiable clauses;

means for creating a first retrievable display relating to said document;

means for updating said document as said clauses are modified, so that each said clause corresponds to the last of said modifications;

means for visually coding said first retrievable display to identify clauses which have not been negotiated, whereby said negotiations can be tracked by reviewing said visually coded display;

means for creating a retrievable summary display for all said clauses, each said clause being represented by a summary identifier;

means for visually coding each said summary identifier consistent with said visually coding of said plurality of respective retrievable clause displays;

each said means being operable at an Internet web site; and, means for providing authorized parties access to said Internet web site for negotiating and tracking said negotiations.

* * * * *